United States Patent
Wylin

[11] Patent Number: 6,127,919
[45] Date of Patent: Oct. 3, 2000

[54] REARVIEW VEHICLE MIRROR WITH AUDIO SPEAKERS

[75] Inventor: James P. Wylin, Waterford, Mich.

[73] Assignee: DaimlerChrysler Corporation, Auburn Hills, Mich.

[21] Appl. No.: 09/266,057

[22] Filed: Mar. 10, 1999

[51] Int. Cl.[7] ..................................................... B60Q 1/00
[52] U.S. Cl. ........................ 340/425.5; 455/345; 359/871
[58] Field of Search ................................ 340/425.5, 427, 340/474; 455/345, 347; 359/871

[56] References Cited

U.S. PATENT DOCUMENTS

| | | |
|---|---|---|
| D. 82,355 | 10/1930 | Weir et al. . |
| D. 304,920 | 12/1989 | Schifrin . |
| 2,392,665 | 1/1946 | Gustafson . |
| 3,099,797 | 7/1963 | Piccinini . |
| 3,950,701 | 4/1976 | Matuoka et al. . |
| 4,326,100 | 4/1982 | Polacsek ............................. 179/1 VE |
| 4,445,228 | 4/1984 | Bruni . |
| 4,550,796 | 11/1985 | Tomita ................................... 181/141 |
| 4,646,210 | 2/1987 | Skogler et al. . |
| 4,768,870 | 9/1988 | Chen . |
| 4,888,072 | 12/1989 | Ohlenforst et al. ..................... 156/108 |
| 5,124,845 | 6/1992 | Shimojo .................................. 359/838 |
| 5,297,212 | 5/1994 | Murayama ................................. 381/86 |
| 5,499,169 | 3/1996 | Chen ..................................... 362/83.1 |
| 5,546,468 | 8/1996 | Beard ....................................... 381/86 |
| 5,649,317 | 7/1997 | Suzuki ................................... 455/345 |
| 5,854,847 | 12/1998 | Yoshida et al. ........................ 381/302 |

*Primary Examiner*—Daniel J. Wu
*Assistant Examiner*—Anh La
*Attorney, Agent, or Firm*—Roland A. Fuller, III

[57] ABSTRACT

A combination rear-view mirror and audio speaker for a vehicle. An audio speaker is coupled to the rear side of the body of a rear-view vehicle mirror. Wiring for the audio speaker or speakers is festooned between the roof of the vehicle and the head liner and down a front support pillar to the audio signal amplifier. In this location, the audio speakers are thus hidden from the vehicle occupants. This location also precludes the obstruction of the vehicle occupants' view through the vehicle windows or rear-view mirror and positions the sound waves eminating from the speakers at the level of the vehicle occupants' ears. Configuration in this manner allows the rear-view mirror assembly to be used across a wide range of vehicles with little or no impact on the vehicle interior, as well as in a wide range of audio systems, including surround-sound systems.

12 Claims, 3 Drawing Sheets

REARVIEW VEHICLE MIRROR WITH AUDIO SPEAKERS

BACKGROUND OF THE INVENTION

1. Technical Field

The present invention relates generally to automotive audio systems and more particularly to a rear-view mirror having at least one audio speaker.

2. Discussion

Modern vehicles such as vans, mini-vans and sport utility vehicles, frequently include audio systems, televisions and other video equipment to entertain the vehicle occupants while transporting between locations. Modern consumers have come to expect the same features in their vehicle entertainment systems as those that are available in typical home systems. One such feature is the "surround sound" audio playback associated with most modern commercially produced video tapes.

Vehicle manufacturers have been reluctant to incorporate surround sound systems in vehicles due in part to the need for a center audio channel and the difficulty in incorporating it into the vehicle. One option for incorporating the center channel into a vehicle was to modify the dash panel to house one or more audio speakers. However, this option was not desirable as the reconfiguration of the vehicle in this manner would be too costly. Another option was to mount a speaker panel onto the roof of the vehicle. This configuration also proved to be costly due to the numerous configurations that were required to accommodate the differing vehicle types and interior designs. Other locations for a separate speaker panel have been considered, but these locations have not been suitable as they tended to obstruct the view of the vehicle occupants through the windshield.

Consequently, there remains a need in the art for a center audio channel for a surround sound system which can be easily integrated into a wide range of vehicles with little or no impact on the vehicle interior.

SUMMARY OF THE INVENTION

It is therefore one object of the present invention to provide a center channel for a vehicle audio system which is easily integrated into a vehicle with little or no impact on the vehicle interior.

It is a further object of the present invention to provide a means for integrating stereo speakers into the front of a vehicle without placing speakers in the doors or the dash panel.

It is a further object of the present invention to provide a center channel for a vehicle audio system which can be utilized for several vehicle types.

The present invention accomplishes these objects by incorporating at least one and preferably two audio speakers into the rear side of the body of a rear-view vehicle mirror. Wiring for the audio speaker or speakers is festooned between the roof of the vehicle and the head liner and down a front support pillar to the audio signal amplifier. In this location, the audio speakers are thus hidden from the view of the vehicle occupants. This location also precludes the obstruction of the vehicle occupants' view through the vehicle windows or rear-view mirror and positions the sound waves eminating from the speakers at the level of the vehicle occupants' ears. Configuration in this manner allows the rear-view mirror assembly to be used across a wide range of vehicles with little or no impact on the vehicle interior, as well as in a wide range of audio systems, including surround-sound systems.

Additional advantages and features of the present invention will become apparent from the subsequent description and the appended claims, taken in conjunction with the accompanying drawings.

BRIEF DESCRIPTION OF THE DRAWINGS

FIG. 5 is a schematic diagram of a stereo audio system for a vehicle incorporating the combination rear-view mirror and speaker device of the present invention.

DETAILED DESCRIPTION OF THE PREFERRED EMBODIMENT

Figure 1:
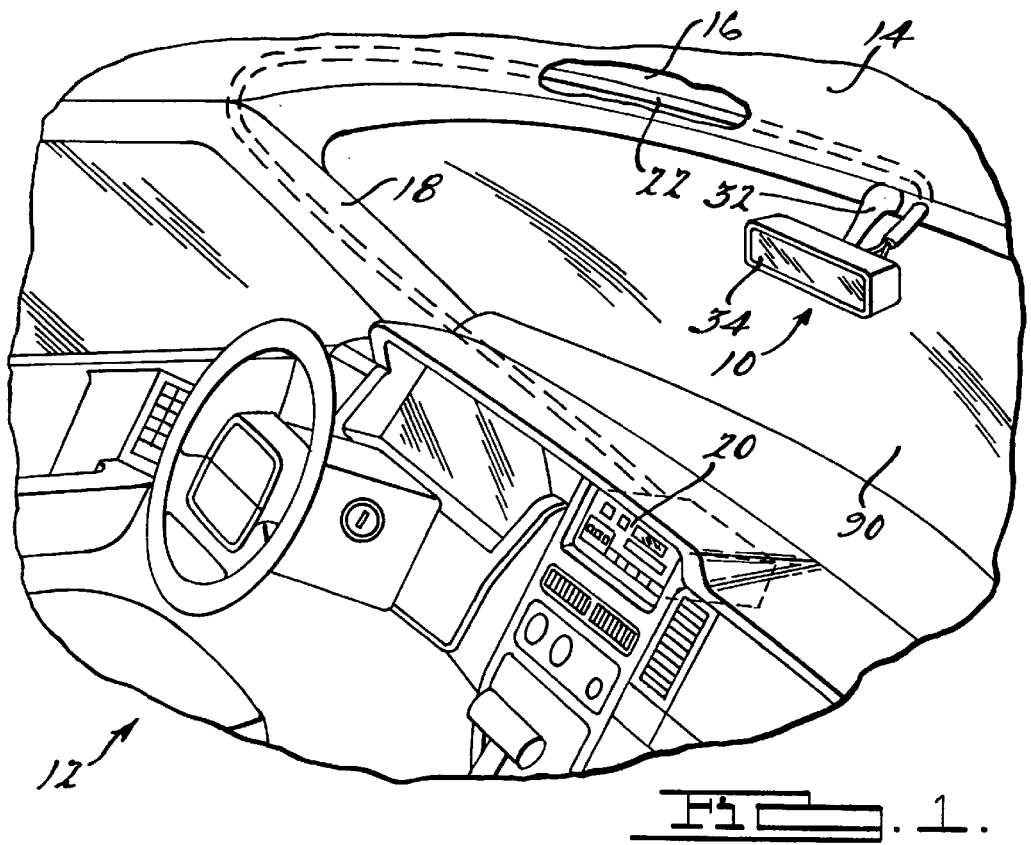
FIG. 1 is a partial perspective view of the interior of a vehicle showing a combination rear-view mirror and speaker device constructed in according to a preferred embodiment of the present invention.

Referring now to FIG. 1 of the drawings, the combination mirror and audio speaker device of the present invention is generally indicated by reference numeral 10. Speaker device 10 is operably coupled to a vehicle 12 which is shown to include a conventional headliner 14, a roof 16, a front pillar 18, an audio signal amplifier 20, and a wiring harness 22. Audio signal amplifier 20 and speaker device 10 are spaced apart in vehicle 12 and coupled by wire harness 22. This allows audio signal amplifier 20 to be positioned in a location where its controls may be easily accessed by the vehicle occupant while operating vehicle 12. Also, as audio signal amplifier 20 may have substantial mass and/or several other electrical connections (e.g., output signals to other audio speakers, antenna input, power input), the positioning of audio signal amplifier 20 in a remote location minimizes the tendency of speaker device 10 to vibrate, as well as hides the electrical connections to audio signal amplifier 20 from the view of the vehicle occupants. Wiring harness 22 is festooned up front pillar 18 and between roof 16 and headliner 14 and is thus substantially hidden from the view of the vehicle occupants.

Figure 2:
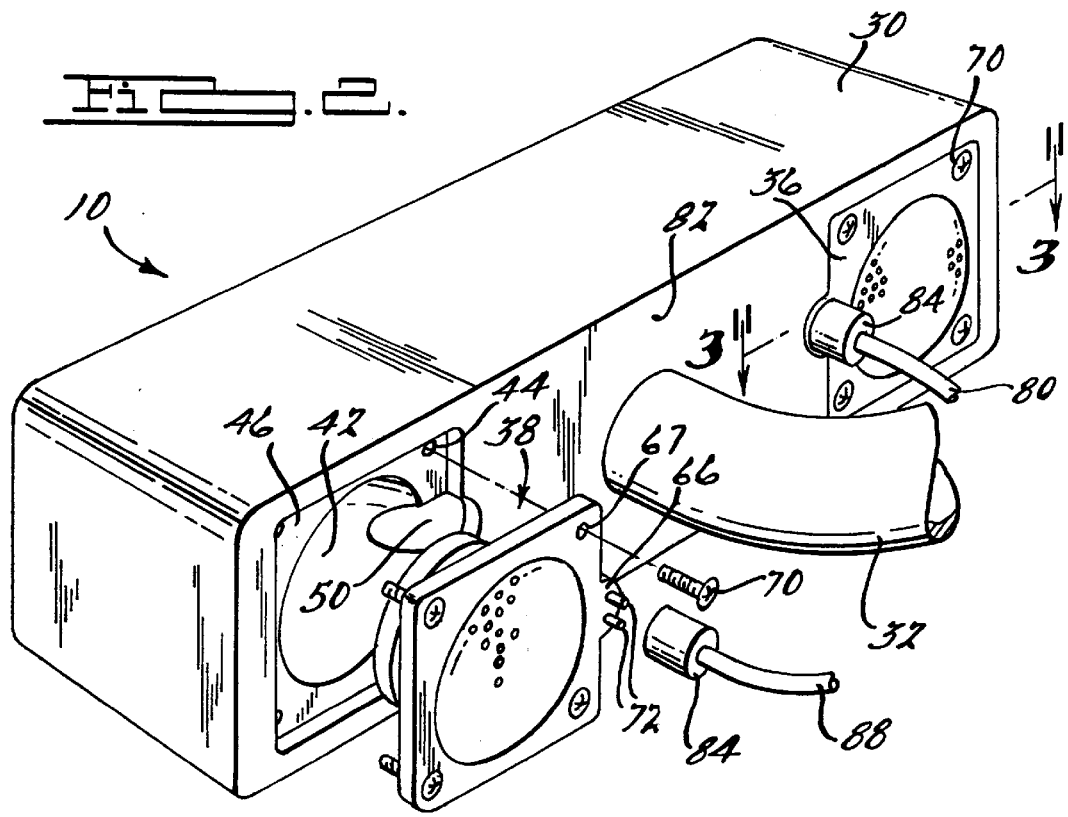
FIG. 2 is a rear perspective view of the combination rear-view mirror and speaker device shown in FIG. 1.
Figure 3:
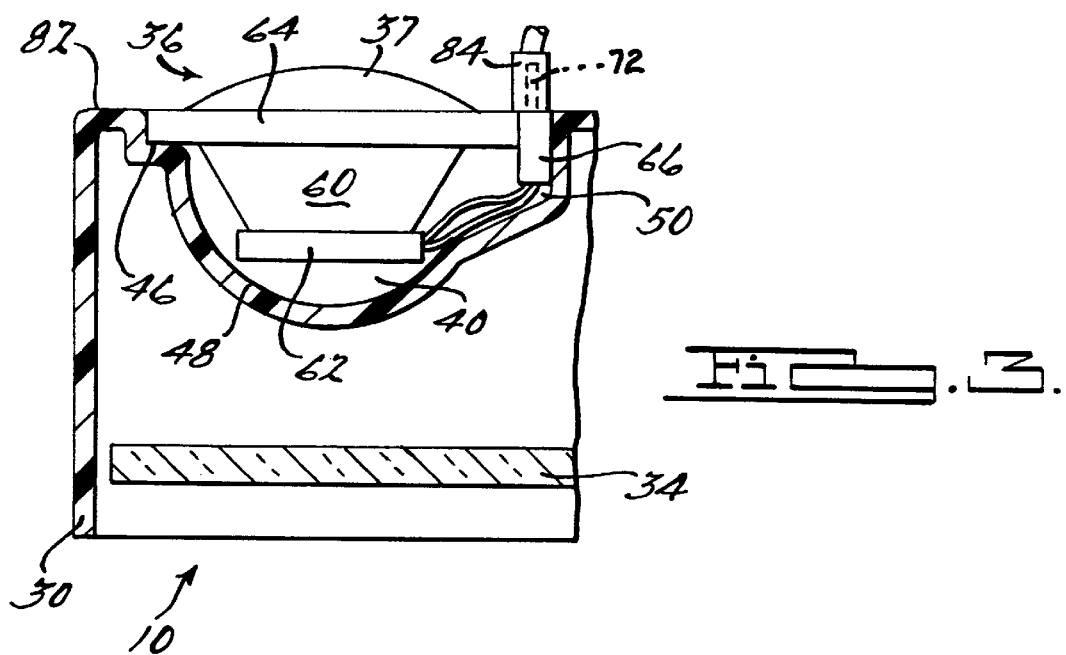
FIG. 3 is a sectional view of a portion of the combination rear-view mirror and speaker device taken along the line 3—3 shown in FIG. 2.

Speaker device 10 is shown in FIGS. 1, 2, and 3 to include a rigid body portion 30, and articulated arm 32, a full-size mirror 34 and first and second audio speakers 36 and 38, respectively. Articulated arm 32 is conventional and couples body portion 30 to vehicle 12 in a manner which allows the vehicle occupant to position mirror 34 as desired. Body portion 30 includes first and second speaker apertures 40 and 42, respectively, and a plurality of retaining apertures 44.

As first and second speaker apertures 40 and 42 are generally similar in construction, only first speaker aperture 40 will be discussed in detail. First speaker aperture 40 includes a recessed flange 46, a central concave depression 48, and a cylindrical bore 50. Recessed flange 46 extends around the perimeter of depression 48 and intersects bore 50. Bore 50 extends further into body portion 30 than does recessed flange 46.

First and second audio speakers 36 and 38 are also generally similar in construction and as such, only first audio speaker 36 will be discussed in detail. First audio speaker 36 is preferrably a tweeter 37 having a relatively low mass so as to minimize the tendency of the first audio speaker 36 to cause mirror 34 to vibrate. First audio speaker 36 includes a speaker body 60, a speaker magnet 62, a speaker flange 64, and terminal post 66. Speaker body 60, speaker magnet 62, and speaker flange 64 are coupled together in a conventional manner. Speaker flange 64 is substantially flat and includes a plurality of retaining apertures 67 which align to apertures 44 in body portion 30.

First audio speaker 36 is placed into first speaker aperture 40 such that speaker flange 64 abuts recessed flange 46 and terminal post 68 is disposed within bore 50. Concave depression 48 is spaced apart from speaker magnet 62. First audio speaker 36 is secured to body portion 30 with a plurality of self-taping fasteners 70, each one of which extends through one aperture 66 and threadably engages its respective aperture 44. Second audio speaker 38 is similarly coupled to body portion 30.

First audio speaker 36 is coupled to audio signal amplifier 20 by a first portion 80 of wire harness 22. First portion 80 extends through headliner 14 proximate articulated arm 32 and extends along a rear side 82 of speaker device 10. First portion 80 terminates at the end proximate first audio speaker 36 in a cylindrical plug 84 having a pair of signal terminal connectors (not shown). Plug 84 is inserted onto terminal post 66 to couple the terminal connectors with their respective signal terminals 72. Second audio speaker 38 is coupled to audio signal amplifier by a second portion 88 of wire harness 22 in a substantially similar manner to that described in conjunction with first audio speaker 36 and as such, will not be discussed in detail.

The coupling first and second audio speakers 36 and 38 to the rear side 82 of body portion 30 effectively conceals the audio source of speaker device 10 from the view of the vehicle occupants and as such, the placement of audio speakers 36 and 38 neither obstructs the vehicle occupant's view out the vehicle front windshield 90 nor impairs the size or quality of the image in mirror 34.

Figure 4:
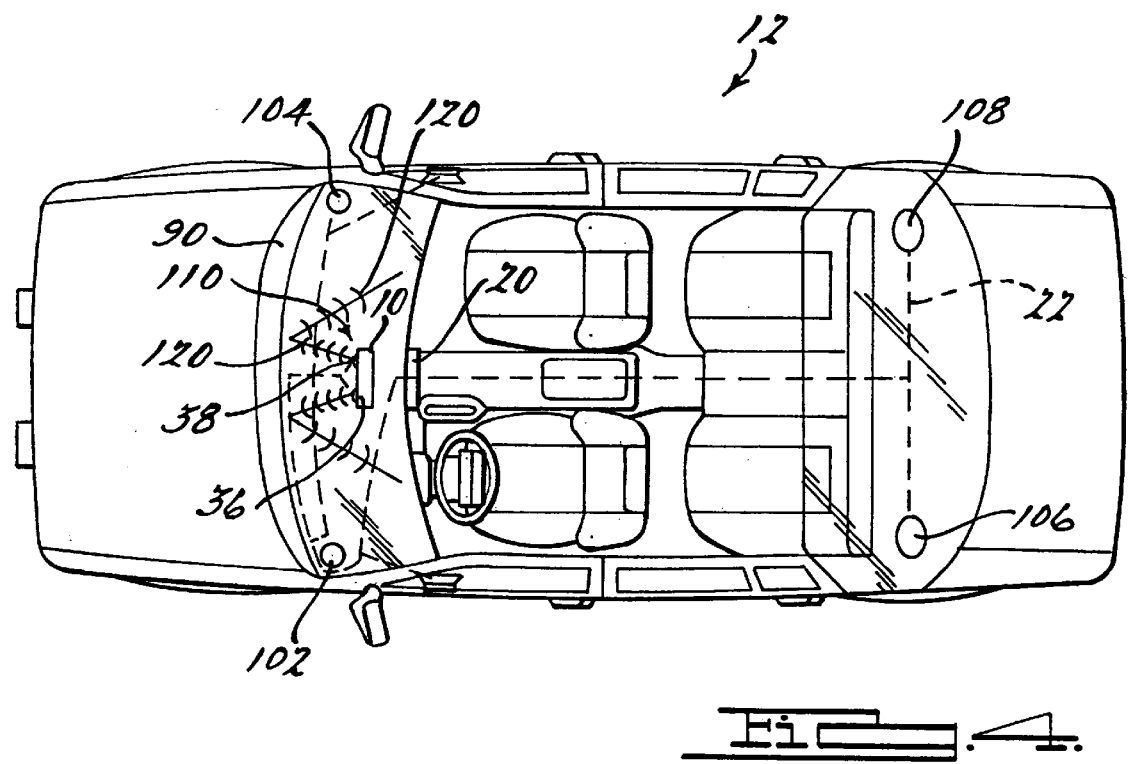
FIG. 4 a schematic diagram of a surround sound audio system for a vehicle incorporating the combination rear-view mirror and speaker device of the present invention.
Figure 3:
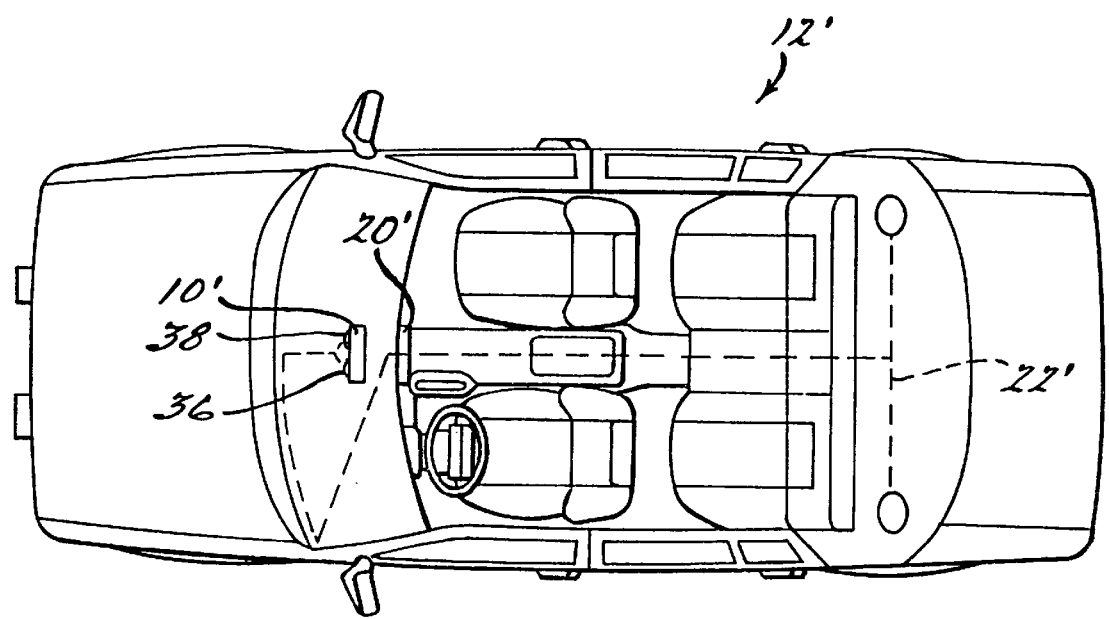

With reference to FIG. 4, a schematic diagram of vehicle 12 is shown to include surround sound system 100. As shown, surround sound system 100 includes audio signal amplifier 20, wiring harness 22, a left front audio speaker 102, a right-front audio speaker 104, a left-rear audio speaker 106, a right-rear audio speaker 108 and a center-channel audio speaker 110. Preferably, audio signal amplifier 20 is capable of operating in a surround-sound mode in which it outputs five distinct audio signals, each one of these signals being transmitted through wire harness 22 to an individual speaker. Audio speakers 102, 104, 106 and 108 are conventional. Center-channel audio speaker 110 is configured in substantial conformance to combination mirror and audio speaker device 10 as previously described. Sound waves 120 emanating from first and second audio speakers 36 and 38 reflect off windshield 90 and back toward the vehicle occupants. It should be noted that as sound waves 120 emanate back from windshield 90, they will be approximately positioned at the ear-level of the vehicle occupants.

In an alternate embodiment, combination mirror and audio speaker device 10' is incorporated into sound system 150 which includes audio signal amplifier 20' and wiring harness 22'. Audio signal amplifier 20' is preferably outputs a two distinct audio signals, each one of these signals transmitted through wire harness 22' to one of the first and second audio speakers 36 and 38. As such, vehicle 12' may be equipped for stereo sound without the need to install speakers in the dash panel, doors or other areas of the vehicle.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

I claim:

1. A combination rear-view mirror and audio speaker for a vehicle comprising:

a body portion having a speaker aperture in a rear exterior side of said body portion;

a mirror coupled to a front side of said body portion;

an articulating arm coupled to said body portion, said articulating arm adapted for mounting said combination rear-view mirror and audio speaker to said vehicle; and an audio speaker disposed at least partially within said speaker aperture and fixed to said body portion, said audio speaker adapted to produce a sound wave, said sound wave emanating from said audio speaker in a direction away from the rear exterior side of said body portion.

2. The combination rear-view mirror and audio speaker for a vehicle of claim 1 wherein said speaker aperture includes a recessed flange and said audio speaker includes a speaker flange, said recessed flange receiving said speaker flange when said audio speaker is fixed to said body portion.

3. The combination rear-view mirror and audio speaker for a vehicle of claim 1 wherein said speaker aperture includes a bore formed in the rear exterior side of the body portion and said audio speaker includes a terminal post adapted for engaging a wire harness plug, said bore receiving said terminal post when said audio speaker is fixed to said body portion.

4. The combination rear-view mirror and audio speaker for a vehicle of claim 3 wherein said terminal post includes a pair of signal terminals adapted for receiving an audio signal.

5. The combination rear-view mirror and audio speaker for a vehicle of claim 1 wherein said audio speaker is a tweeter.

6. A combination rear-view mirror and audio speaker for a vehicle comprising:

a body portion having a speaker aperture in a rear exterior side of said body portion, said speaker aperture including a recessed flange and a bore;

a mirror coupled to a front side of said body portion; and a tweeter having a speaker flange and a terminal post with a plurality of signal terminals adapted for receiving an audio signal, said tweeter fixed to said body portion such that said tweeter is disposed at least partially within said speaker aperture, said recessed flange receiving said speaker flange and said bore receiving said terminal post, said tweeter adapted to produce a sound wave, said sound wave emanating from said tweeter in a direction away from the rear exterior side of said body portion.

7. An audio system for a vehicle having a windshield, said audio system comprising:

a combination rear-view mirror and audio speaker for a vehicle having a body portion, a mirror, an articulating arm and an audio speaker, said body portion including a speaker aperture in a rear external side of said body portion, said mirror coupled to a front side of said body portion, said articulating arm coupled to said body portion at a first end, said articulating arm adapted for attachment to said vehicle at a distal end, and said audio speaker disposed at least partially within said speaker aperture and fixed to said body portion, said audio speaker adapted to produce a sound wave, said sound wave emanating from said audio speaker in a direction away from the rear exterior side of said body portion;

an audio signal amplifier spaced apart from said combination rear-view mirror and audio speaker; and a wiring harness coupled at a first end to said audio signal amplifier and to said audio speaker at a second end.

8. The audio system for a vehicle of claim 7 wherein said speaker aperture includes a recessed flange and said audio speaker includes a speaker flange, said recessed flange receiving said speaker flange when said audio speaker is fixed to said body portion.

9. The audio system for a vehicle of claim 7 wherein said speaker aperture includes a bore formed in the rear exterior side of the body portion and said audio speaker includes a terminal post for engaging a plug on said wire harness to electrical couple said audio speaker and said wire harness, said bore receiving said terminal post when said audio speaker is fixed to said body portion.

10. The audio system for a vehicle of claim 9 wherein said terminal post includes a pair of signal terminals.

11. The audio system for a vehicle of claim 7 wherein said audio system is a surround-sound audio system and said combination rear-view mirror and audio speaker is a center-channel of said surround-sound audio system.

12. The audio system for a vehicle of claim 7 wherein said audio speaker is a tweeter.

* * * * *